United States Patent
Lueder et al.

(10) Patent No.: US 6,721,645 B2
(45) Date of Patent: Apr. 13, 2004

(54) DISTANCE-RELATED METHOD FOR CONTROLLING THE SPEED OF A VEHICLE

(75) Inventors: Jens Lueder, Kornwestheim (DE); Werner Uhler, Bruchsal (DE); Hermann Winner, Karlsrue (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/018,111

(22) PCT Filed: Mar. 24, 2001

(86) PCT No.: PCT/DE01/01150

§ 371 (c)(1),
(2), (4) Date: Apr. 22, 2002

(87) PCT Pub. No.: WO01/79013

PCT Pub. Date: Oct. 25, 2001

(65) Prior Publication Data

US 2002/0138192 A1 Sep. 26, 2002

(30) Foreign Application Priority Data

Apr. 14, 2000 (DE) .......................................... 100 18 558

(51) Int. Cl.$^7$ ................................................. B60T 8/32
(52) U.S. Cl. ............................................ 701/93; 701/96
(58) Field of Search ..................... 701/96, 93; 180/169; 340/435

(56) References Cited

U.S. PATENT DOCUMENTS

| | | | |
|---|---|---|---|
| 5,467,283 A | | 11/1995 | Butsuen et al. ............. 701/301 |
| 5,615,117 A | * | 3/1997 | Serizawa ..................... 701/42 |
| 5,745,870 A | | 4/1998 | Yamamoto et al. ......... 701/301 |
| 6,128,559 A | * | 10/2000 | Saitou et al. .................. 701/23 |

FOREIGN PATENT DOCUMENTS

| | | |
|---|---|---|
| DE | 42 42 700 | 6/1994 |
| DE | 197 22 947 | 2/1999 |
| EP | 0 657 857 | 6/1995 |
| EP | 1 060 937 | 12/2000 |

* cited by examiner

Primary Examiner—Marthe Y. Marc-Coleman
(74) Attorney, Agent, or Firm—Kenyon & Kenyon

(57) ABSTRACT

A method for controlling the speed of a vehicle is proposed, where, in the vehicle to be controlled, the yaw rate or rotation rate is measured, in particular to determine the curvature of the vehicle's own travel trajectory, and where, using a proximity sensor or position sensor, at least one vehicle traveling ahead or at least some other object within a sensor's sensing range is detected, particularly with regard to an offset from the travel course of the vehicle to be controlled. From the detection of one or of a plurality of objects, the curvature of the vehicle's own travel trajectory may be corrected with a view to a prediction of an expected curvature from the averaging of the positional changes ascertained at the plurality of the objects.

9 Claims, 2 Drawing Sheets

DISTANCE-RELATED METHOD FOR CONTROLLING THE SPEED OF A VEHICLE

FIELD OF THE INVENTION

The present invention relates to a method for controlling the speed of a vehicle, particularly under consideration of vehicles driving ahead.

BACKGROUND INFORMATION

From German Published Patent Application No. 42 42 700, it is known to mount a radar sensor or an infrared sensor on a vehicle to detect vehicles driving ahead. This radar sensor can be, for example, a module of a vehicle comfort and convenience system ACC (adaptive cruise control), in which information pertaining to the distance and the relative speed of the vehicle with respect to other vehicles and information on road conditions are continually processed.

The basic functions of the above described system are directed to controlling the vehicle speed, either to a setpoint value, here the desired speed, or to the speed of a vehicle driving ahead, in the case that the latter is traveling at a slower speed than the desired speed and is within the sensing range of the radar sensor. As mentioned above, this sensor can be, for example, a component of a microwave radar or of an infrared lidar and, to that end, it measures the distance, the relative speed, and the angle of objects, particularly of vehicles driving ahead within the sensing range.

From German Patent No. 197 22 947, a method is known, where, in addition to measuring the quantities described above, the future travel-course progression of the vehicle is included, along with the ACC system, in the control. For this, the future travel-course range of at least one vehicle driving ahead is determined, and a lateral offset is then ascertained for all detected vehicles. The future travel corridor to determine. Given steady-state curvature conditions of the roadway, i.e., in a linear portion or in the region of constant curvature of a curve, the future travel corridor is also able to be easily determined using the known method, with the aid of a well-adjusted yaw-rate or rotation-rate signal.

From the yaw rate of the ACC vehicle, the curvature of the roadway and, therefore, also the travel-course offset of a vehicle traveling ahead can be determined here, using generally known method steps. If this travel-course offset is smaller in terms of absolute value than a predefined width of the travel corridor, then one can infer that the vehicle traveling ahead is located in the travel corridor of the ACC vehicle. When working with changing conditions, particularly in the beginning curve region, however, one is normally no longer able to correctly determine the association with the travel corridor, so that it can happen that a vehicle driving ahead in the right, adjacent lane, near the beginning of a left curve, is incorrectly attributed to the travel corridor. This leads to faulty control reactions, the cause here being the mistaken curvature prediction, since the ascertained curvature is always specific to the current instant and, therefore, the reaction to a change in curvature is too late.

SUMMARY OF THE INVENTION

A method for controlling the speed of a vehicle of the type mentioned at the outset, where, in the vehicle to be controlled, the yaw rate or rotation rate is measured, in particular to determine the curvature of the vehicle's own travel trajectory, and where, using a proximity sensor or position sensor, at least one vehicle traveling ahead or at least some other object within a sensor's sensing range is detected with regard to an offset from the travel course of the vehicle to be controlled, is advantageously further refined in accordance with the present invention.

As already mentioned at the outset, curvature k of the roadway may be calculated in a simple manner from the measured yaw rate of the ACC vehicle to be controlled using generally known method steps in that the yaw rate is divided by the speed, and, using that, the travel-course offset yc of a vehicle traveling ahead may also be determined. Specifically, travel-course offset yc may by determined using the following formula:

$$yc = yv - k * d^2 / 2,$$

quantity yv being the measured lateral offset, without allowing for curvature k, and d being the distance between the vehicle to be controlled and the measured vehicle driving ahead.

If this travel-course offset yc is smaller in terms of absolute value than a predefined width $y_{lane}$, then one may infer that the object or the vehicle is located in the travel corridor of the ACC vehicle, $y_{lane}$ corresponding approximately to one half of a lane width.

A collective shift in the radar targets may be utilized as an indication of a future change in the curvature. As long as the assumption can be made that vehicles driving ahead maintain their lane, their movement is already an early indication that a change in curvature follows. Thus, from the detection of a plurality of objects, the present invention provides for correcting the curvature of the vehicle's own travel trajectory with a view to a prediction of an expected curvature, an averaging of positional changes ascertained at a plurality of the objects being taken as a basis here.

In an especially preferred specific embodiment, corrected curvature k is advantageously measured for the plurality of the detected objects in preset time intervals of angles αi corresponding to lateral offset |yv|. For each object, angle variation $d\alpha_i$ from a measurement to the respective preceding measurement is determined, and, in each measuring cycle, angle variations $d\alpha_i$ are averaged over the collective detected objects, and divided by the time duration between the measuring cycles to generate a collective angular velocity $\alpha Dt_{koll}$. From the addition of collective angular velocity $\alpha Dt_{koll}$ to the yaw rate measured in the vehicle to be controlled, a correction is then ascertained for a future curvature k of the travel trajectory of the vehicle to be controlled.

It is also advantageous when future curvature k is calculated by dividing the sum of the yaw rate and collective angular velocity $\alpha Dt_{koll}$ by the driving speed of the vehicle to be controlled. Furthermore, angular variation $d\alpha_i$, measured for each object, may be simply corrected in each instance by the relative velocity of the vehicle to be controlled in relation to the object's movement and the yaw rate. To improve the measuring result, it is also possible, when ascertaining collective angular velocity $\alpha Dt_{koll}$ over a plurality of measuring cycles, to average the values determined at any one time.

To obtain a still further improved method for predicting the travel-course progression of the vehicle to be controlled, it is also possible for a number of further detection devices for determining the travel-course offset of objects located ahead, to be present in the vehicle to be controlled. All results of these detection devices may then be analyzed and weighted. The analysis and weighting may preferably be carried out using a video camera, a preferably satellite-supported navigational system, or a set-up for determining a historical lateral offset of the vehicles driving ahead, or on the basis of a travel-course determination made by interpreting the position of fixed destinations determine the travel-course offset.

DETAILED DESCRIPTION

Figure 1:
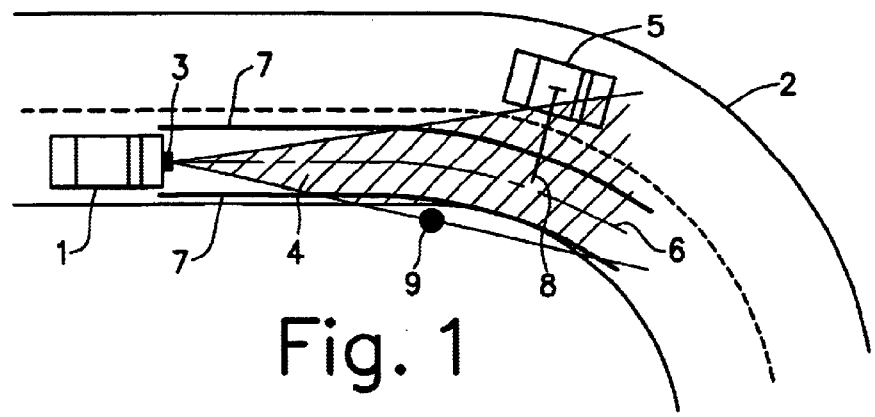
FIG. 1 shows a sketch of a curved roadway path, including a vehicle whose speed is to be controlled, and further objects.

FIG. 1 shows an ACC vehicle 1 to be controlled, which is located on a roadway 2 having a plurality of lanes. Vehicle 1 has, for example, a radar sensor 3 having a radar detection range 4; other detection set-ups are also mountable on vehicle 1, such as video or navigational devices, which may be used to detect roadway 2 or the area surrounding the roadway. Situated on roadway 2, as an object driving ahead, is a vehicle 5, in reality, a plurality of such objects being present at various distances and at different speeds.

The ACC system in vehicle 1 includes a control system (not explained in further detail here) for influencing speed, and a plurality of sensors, such as a yaw-rate or rotation-rate sensor, a steering-angle sensor, wheel-speed sensors, or a transversal-acceleration sensor. A dot-dash line 6 represents the future desired travel-course progression, i.e., the travel trajectory of vehicle 1, and the two lines 7 show the future travel-course range or travel corridor. A line segment 8 indicates the lateral or travel-course offset of vehicle 5 driving ahead with respect to the travel course of vehicle 1. Sketched in here as a stationary object is a tree 9, no collective yaw rate for such fixed destinations being available, however, prior to entry into the curve.

In the following, with reference to FIGS. 2, 3, and 4, the assumption is made that, in addition to vehicle 5 according to FIG. 1, a number i of further objects (not shown in FIG. 1) moving or located ahead in the course of roadway 2 or in detection range 4, are sensed and evaluated. Thus, in the exemplary embodiment of the present invention, on the basis of the detection of a plurality of objects i, the curvature of ACC vehicle's 1 own travel trajectory 6 is corrected with a view to a prediction of an expected curvature of roadway 2, the positional changes ascertained at the plurality of objects i being averaged here in accordance with the functional diagram of FIG. 2.

Figure 2:
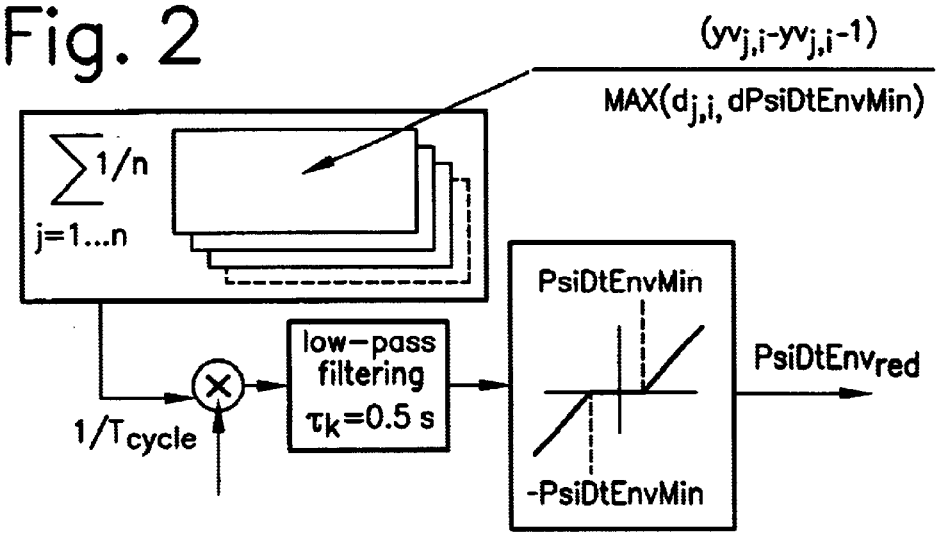
FIG. 2 shows a schematic basic circuit diagram of a method for calculating a future travel-course progression of the vehicle and/or for correcting the curvature of the travel trajectory, in consideration of an ambient yaw rate of a plurality of objects.

Block 20 in FIG. 2 symbolically shows that curvature k of travel trajectory 6 is corrected for detected objects i in preset time intervals. For each object i, the angle variation $d\alpha_i$ of the travel-course offset from a measurement to the respective preceding measurement is determined, and, in each measuring cycle, angle variations $d\alpha_i$ are averaged over the collective detected objects, and divided by the time duration between the measuring cycles to generate a collective angular velocity $\alpha Dt_{koll}$. From the addition of collective angular velocity $\alpha Dt_{koll}$ to the yaw rate measured in vehicle 1 to be controlled, a correction is then ascertained for a future curvature k of travel trajectory 6 of vehicle 1 to be controlled.

Here, it is also possible for future curvature k to be calculated by dividing the sum of the yaw rate and collective angular velocity $\alpha Dt_{koll}$ by the driving speed of vehicle 1 to be controlled. Furthermore, angular variation $d\alpha_i$, measured for each object i, may be simply corrected in each instance, on the one hand, by the relative velocity of vehicle 1 to be controlled in relation to the object's movement and, on the other hand, by the yaw rate. To improve the measuring result, in the context of ascertaining collective angular velocity $\alpha Dt_{koll}$ over a plurality of measuring cycles, the determined values are averaged using low-pass filter 21 depicted in FIG. 2.

The following describes a method for performing the previously described calculation of the travel-course offset to predict the travel course, under consideration of the collective ambient yaw rate of objects i. The selected abbreviations represent the short forms of the corresponding physical quantities commonly input into a data-processing system.

For the calculation, a component, which, as mentioned above, is derived from the collective angular variation of radar objects i, is added to filtered trajectory curvature $K_{traj}$ of vehicle 1 to be controlled. This angular velocity is designated here as ambient yaw rate PsiDtEnv. As the rotation of vehicle 1 about the vertical axis, yaw rate PsiDt describes the instantaneous curvature k of travel trajectory 6 according to FIG. 1. The following relation results ($v_{Veh}$= speed of the vehicle to be controlled in the longitudinal direction):

$$K = PsiDt/v_{Veh}.$$

The appropriate control unit in vehicle 1 makes available an offset-corrected yaw rate, in the context of which any existing yaw-rate offsets are eliminated under consideration of the signals from a steering-wheel angle sensor, a transversal-acceleration sensor, a wheel-speed sensor, and a rotation-rate sensor. In the process, deviations in the individual signals are checked for plausibility and, if the deviations are too great, this is indicative of failure of a sensor. Trajectory curvature $k_{Traj}$ may be generated, e.g., by way of a simple low-pass filtering ($T_{cycle}$=cycle time of the controller, $\tau Kap$=time constant of the controller):

$$k_{Traj}(tj) = (T_{cycle}/\tau_{Kap}) * (k(t_j) - k_{Traj}(t_{j-1})).$$

Ambient yaw rate PsiDtEnv is determined by the virtual angular velocity of radar objects i. On the one hand, this quantity renders possible a prediction of the change in curvature and, on the other hand, a compensation in the context of ACC vehicle's 1 own lane changes. The ambient yaw rate is made up of the ensemble averaging of angular variation PsiDeltaSum under consideration of a relative-speed- and yaw-rate-independent compensation term and of a subsequent low-pass filtering using time constants $\tau Kap$, which is also used for the low-pass filtering of trajectory curvature $k_{Traj}$. Thus, with a limitation to objects having the same speed or, otherwise, applying a correction by $v_r$ (speed of the target objects) and PsiDt, the proportional corrections are derived:

$$PsiDeltaSum(t_j) = \Sigma[(yv_i(t_j) - yv_i(t_{j-1}) - (v_r PsiDt \, dt \, d/v_{veh}))/ \\ MAX(dPsiDtEnvMin, d_i(t_j))],$$

for i=1 ... n given n≧1 valid target objects, otherwise value 0.

The collective yaw rate is expressed as:

$$PsiDtEnv(t_j)=(PsiDeltaSum(t_j)/\text{MAX}(1,n)-T_{cycle}*PsiDtEnv(t_{j-1}))/\tau Kap.$$

To lessen noise effects, the ambient yaw rate is reduced in terms of its absolute value by a small value:

$$PsiDtEnv_{red}(tj)=\text{SIGN}(PsiDtEnv(t_j))*\text{MAX}(O, |PsiDtEnv(t_j)|-PsiDtEnv\text{Min}).$$

Figure 3:
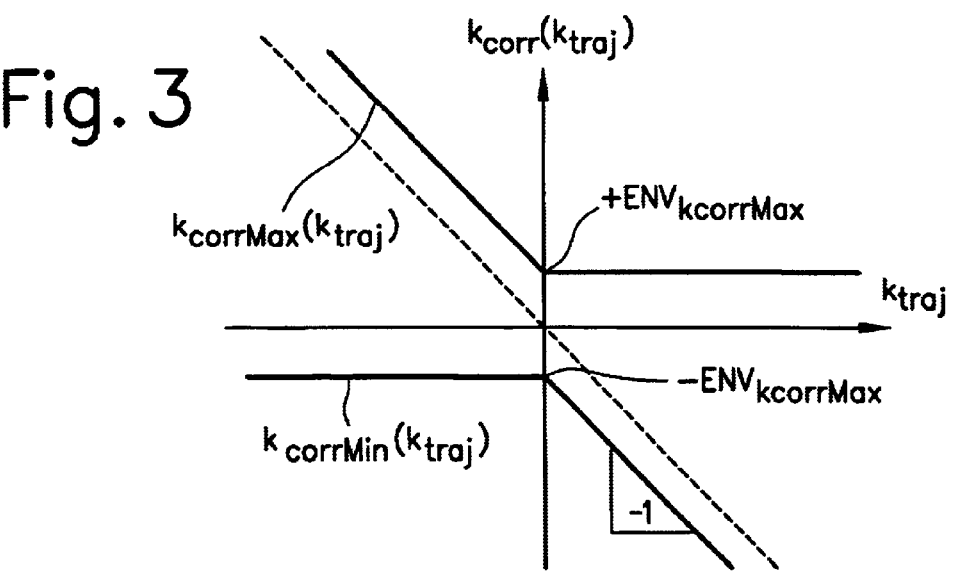
FIG. 3 shows a diagram for limiting the curvature correction.

A diagram is illustrated in FIG. 3, which indicates a relation between curvature $k_{Traj}$ of trajectory 6 of vehicle 1 to be controlled and a correction curvature $k_{Corr}$. In this context, the calculation of the future course is limited to the determination of the second coefficient in accordance with an assumed constant parabolic curvature. This curvature is then generated from the sum of trajectory curvature $k_{Traj}$ and correction curvature $k_{Corr}$, which is generated, in turn, from the ambient yaw rate, as described further above. Here, the limits for $k_{Corr}$ take into account both the lane change as well as a possible lead of vehicle 1 at the beginning of the curve.

$$k_{Corr}=\text{MIN}(-k_{Traj}/2+|k_{Traj}|/2+k_{CorrMax}\cdot\text{MAX}(-k_{Traj}/2-|k_{Traj}|/2-k_{CorrMax}\cdot PsiDtEnv/v_{veh})) \text{ and } k_{Course}(tj)=k_{Traj}(tj)+k_{Corr}.$$

Besides the calculation of the course curvature itself, a course quality in the form of a value $k_{error}$ is also calculated, which is required for the calculation of a so-called lane probability. In the process, $k_{error}$ is specified as a combination of a relative error (RelKapErr), a minimal absolute error (KapErrMin) at low speeds, and of a yaw-rate error (PsiDtError) as follows:

$$k_{error}=\text{MAX}(RelKapErr*|k_{Course}|, \text{MIN}(KapErrMin,PsiDt\text{Error}/\text{MAX}(v_{Veh}, v_{Veh}/v_{Min}))).$$

Figure 4:
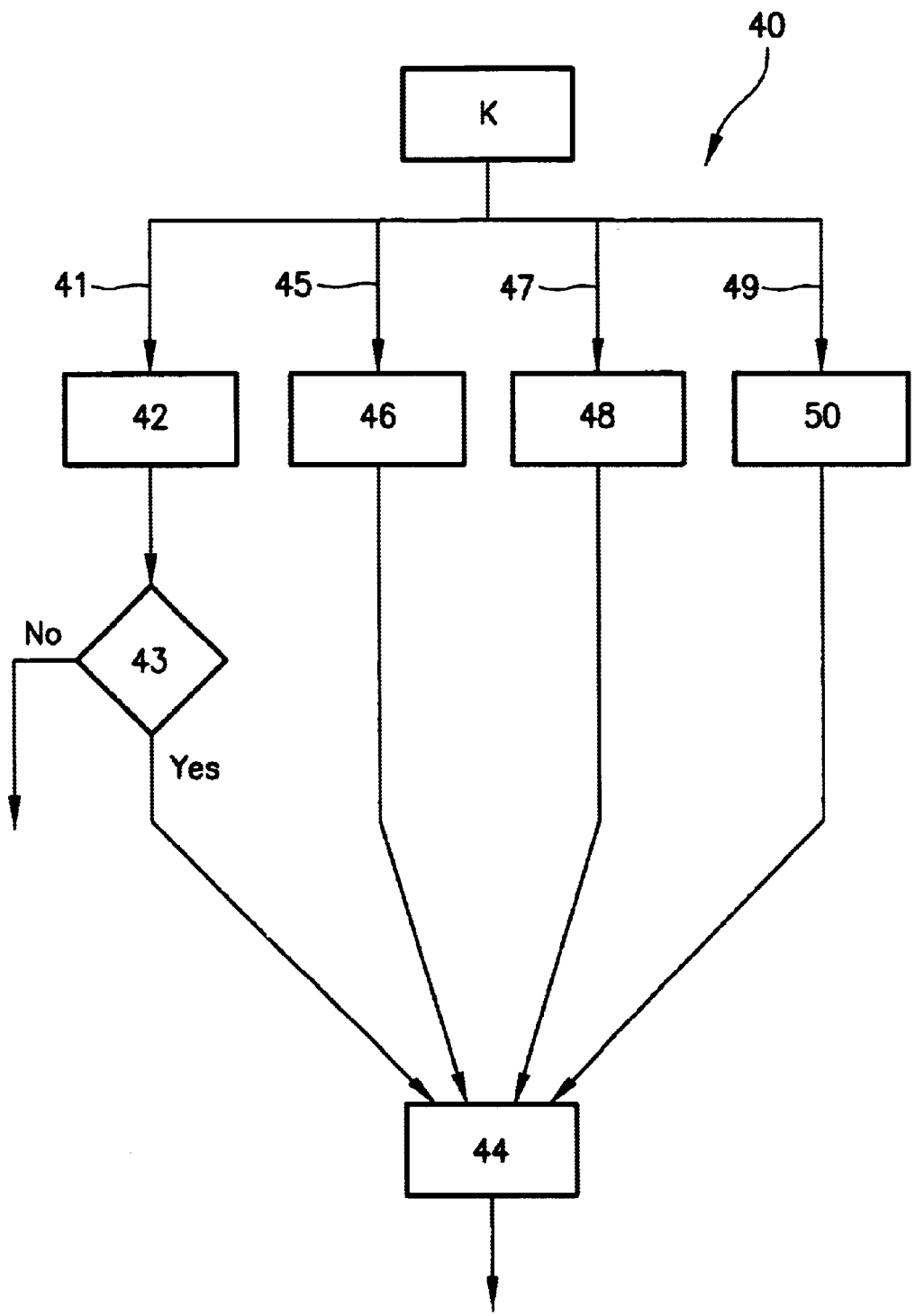
FIG. 4 shows a block diagram relating to the analysis and weighting when correcting curvature using a plurality of detection methods.

FIG. 4 shows a block diagram 40, which indicates various possibilities for detecting and evaluating objects within travel-course progression k of an ACC vehicle, which may also be used in different combinations, individually or together. In left branch 41, the previously more closely described calculation is shown of a future travel-course progression by adding the vehicle's own trajectory from the vehicle's own yaw rate, to a collective yaw rate in a block 42. In a block 43, by consulting the active object data, a decision may now be made as to whether a detected vehicle is located in the vehicle's own calculated travel corridor and, therefore, comes under consideration as an object to which the vehicle's own speed should be adapted. If this is answered in the affirmative, the actual control may then be carried out in a control system 44.

For this, in a parallel branch 45, it is intended for a video system 46 to be present, which likewise is able to define the vehicle's own travel corridor and detect an object driving ahead as a control object. In a further branch 47, a navigational system 48 is provided, which, with knowledge of the vehicle's own position and, under consideration of existing map material, is able to effect the same control mechanisms as previously described.

In a further branch 49, in a module 50, a travel course prediction may be made for ACC vehicle 1, which, in the calculation, considers a historical, lateral offset between ACC vehicle 1 and a detected object i.

In another parallel branch 51, in a module 52, a travel course determination may also be made using a travel-course offset ascertained by interpreting the position of fixed destinations, for example at the edge of the roadway.

In actual control system 44, by analyzing the results from the calculations of individual branches 41, 45, 47, 49, and 51, a final decision may now be made with respect to the selection of the vehicle driving ahead, if indicated, including a weighting of the individual results, to which the ACC vehicle adapts its speed.

What is claimed is:

1. A method for controlling a speed of a vehicle, comprising the steps of:

in the vehicle to be controlled, measuring one of a yaw rate and a rotation rate to determine a curvature of a trajectory of the vehicle;

causing one of a proximity sensor and a position sensor to detect one of at least one vehicle traveling ahead and at least some other object within a sensing range, with regard to an offset from a travel course of the vehicle to be controlled;

from a detection of a plurality of objects, correcting the curvature of the trajectory of the vehicle with a view to a prediction of an expected curvature from an averaging of positional changes ascertained at the plurality of the objects;

measuring the corrected curvature for the detected plurality of objects in preset time intervals of angles corresponding to a lateral offset;

for each object, determining an angle variation from a measurement to a respective preceding measurement;

in each measuring cycle, averaging the angle variations over a collective of the detected objects and dividing the angle variations by a time duration between the measuring cycles to generate a collective angular velocity; and from an addition of the collective angular velocity to the yaw rate measured in the vehicle to be controlled, ascertaining a correction for a future curvature of the trajectory of the vehicle to be controlled.

2. The method according to claim 1, further comprising the step of:

calculating the future curvature by dividing a sum of the yaw rate and the collective angular velocity by a driving speed of the vehicle to be controlled.

3. The method according to claim 1, further comprising the step of:

correcting the angle variation measured for each object in each instance by a relative velocity of the vehicle to be controlled in relation to a movement of the object and the yaw rate.

4. The method according to claim 1, wherein:

with respect to ascertaining the collective angular velocity over a plurality of measuring cycles, averaging determined values of the angle variations.

5. A method for controlling a speed of a vehicle, comprising the steps of:

in the vehicle to be controlled, measuring one of a yaw rate and a rotation rate to determine a curvature of a trajectory of the vehicle;

causing one of a proximity sensor and a position sensor to detect one of at least one vehicle traveling ahead and at least some other object within a sensing range, with regard to an offset from a travel course of the vehicle to be controlled;

from a detection of a plurality of objects, correcting the curvature of the trajectory of the vehicle with a view to a prediction of an expected curvature from an averaging of positional changes ascertained at the plurality of the objects; and in the vehicle to be controlled, generating a rapid curvature of the trajectory of the vehicle from a difference between an actively filtered curvature of the trajectory of the vehicle and an unfiltered curvature of the trajectory of the vehicle, under consideration of a noise-suppression parameter.

6. A method for controlling a speed of a vehicle, comprising the steps of:

in the vehicle to be controlled, measuring one of a yaw rate and a rotation rate to determine a curvature of a trajectory of the vehicle;

causing one of a proximity sensor and a position sensor to detect one of at least one vehicle traveling ahead and at least some other object within a sensing range, with regard to an offset from a travel course of the vehicle to be controlled;

from a detection of a plurality of objects, correcting the curvature of the trajectory of the vehicle with a view to a prediction of an expected curvature from an averaging of positional changes ascertained at the plurality of the objects; and in the vehicle to be controlled, adding a correction curvature to a calculated curvature of the trajectory of the vehicle.

7. A method for controlling a speed of a vehicle, comprising the steps of:

in the vehicle to be controlled, measuring one of a yaw rate and a rotation rate to determine a curvature of a trajectory of the vehicle;

causing one of a proximity sensor and a position sensor to detect one of at least one vehicle traveling ahead and at least some other object within a sensing range, with regard to an offset from a travel course of the vehicle to be controlled;

from a detection of a plurality of objects, correcting the curvature of the trajectory of the vehicle with a view to a prediction of an expected curvature from an averaging of positional changes ascertained at the plurality of the objects; and in the vehicle to be controlled, calculating a course quality representing a combination of a relative error, a minimal absolute error at a low speed, and of a yaw-rate error, the course quality being utilized for calculating a lane probability of the vehicle to be controlled.

8. The method according to claim 7, further comprising the steps of:

in the vehicle to be controlled, providing a number of further detection devices for measuring positions of objects driving ahead; and to select an object driving ahead as a vehicle to which a speed of the vehicle to be controlled is to be adapted, evaluating and weighting all results from the further detection devices.

9. The method according to claim 8, wherein:

the evaluation and weighting are carried out using one of a video camera, a satellite-supported navigational system, a system for analyzing fixed destinations, and a system for determining a historical lateral offset of the objects driving ahead.

* * * * *